(12) United States Patent
Pollock et al.

(10) Patent No.: US 6,992,844 B2
(45) Date of Patent: Jan. 31, 2006

(54) SYSTEM AND METHOD FOR PROVIDING A HERMETICALLY SEALED LENS AND WINDOW ASSEMBLY

(75) Inventors: John A. Pollock, Wilton, NH (US); Anthony DeSantis, New Boston, NH (US)

(73) Assignee: Special Hermetic Products, Inc., Wilton, NH (US)

( * ) Notice: Subject to any disclaimer, the term of this patent is extended or adjusted under 35 U.S.C. 154(b) by 0 days.

(21) Appl. No.: 10/914,895

(22) Filed: Aug. 10, 2004

(65) Prior Publication Data

US 2005/0052758 A1    Mar. 10, 2005

Related U.S. Application Data

(60) Provisional application No. 60/501,537, filed on Sep. 8, 2003.

(51) Int. Cl.
*G02B 7/02* (2006.01)

(52) U.S. Cl. .................. 359/820; 359/811; 359/819

(58) Field of Classification Search ............. 359/819, 359/811, 813, 818, 820–821; 396/526; 362/455; 353/100
See application file for complete search history.

(56) References Cited

U.S. PATENT DOCUMENTS 6,404,939 B1 *  6/2002  Wada .................. 382/312
6,657,798 B1 * 12/2003  Kabelevs et al. ........ 359/819

* cited by examiner

Primary Examiner—Hung Xuan Dang
Assistant Examiner—Joseph Martinez
(74) Attorney, Agent, or Firm—Peter A. Nieves; Sheehan Phinney Bass + Green, P.A.

(57) ABSTRACT

A system and method of forming a hermetic seal between a lens or window and a lid, which minimizes bending moments, and therefore, bifringance on the window or lens is disclosed. This is accomplished by use of a transition member, specific geometries, and selection of the coefficient of thermal expansion of the materials to insure that the solder joint is in compression on cool down and solder strains are maintained within acceptable limits. The transition member may be soldered or welded to lid or integral through machining.

18 Claims, 7 Drawing Sheets

SYSTEM AND METHOD FOR PROVIDING A HERMETICALLY SEALED LENS AND WINDOW ASSEMBLY

FIELD OF THE INVENTION

This application claims priority to co-pending U.S. Provisional Application entitled, "Hermetically Sealed Lens and Method of Providing the Same," having Ser. No. 60/501,537, filed Sep. 8, 2003, which is entirely incorporated herein by reference.

BACKGROUND OF THE INVENTION

Glass is typically made from fused Silica and may be shaped to form a lens or window. To focus light, glass reflects and refracts light based on its shape, material properties, and an angle of incident light. If the shape of the glass is distorted, for example by external forces, light rays traveling through the glass, or bouncing off the glass surface, may be directed in an undesired direction. This undesired redirection of light can cause problems, especially with optical systems that rely on the stability of optical characteristics.

With advancements in technology, lenses have been utilized in many different environments including, but not limited to, outer space, where the lens must be enclosed in an air-tight body. Temperature changes can cause thermal expansion problems in a lens assembly.

A typical lens or window assembly contains a lens or a window secured to a lid that may be part of an enclosure for housing electronic components, for example, sensitive detectors. The lens or window may have a metallic coating on one surface of the lens and is secured to the lid by soldering. The lens or window may have a different coefficient of thermal expansion (CTE) than that of the lid. A change in temperature will cause the lid to expand or contract faster or slower than the lens or window, which can impart forces on the lens or window. The lens or window is soldered along one surface and, therefore, the imparted forces are not in the plane of the lens. This can generate a bending moment that can cause the lens to bow enough to adversely affect the optical characteristics of the lens. Bifringence is a by-product of the stresses caused by the bending moment imposed on the glass and may result in unacceptable distortion of images through the lens or window.

The lens, frame, and lid may be coupled together using soldering techniques to provide a hermetic seal. Unfortunately, the seal between the lens and the frame may impart detrimental forces to the lens that may change the shape of the lens enough to cause optical problems. The solder joint may also fail due to these external forces, thereby compromising the hermetic seal. Soldering a minimal clearance joint between the lens and the frame results in a very thin layer of solder. While a thin layer of solder exhibits great strength in certain contexts and types of testing, it does not provide for significant radial compliance in the configuration described above. Accordingly, when the lens assembly is subjected to temperature cycling, as is required in the testing of many military components, the solder joint may fail. In addition, the hard solder joint may not fail during testing and may instead fail during use of the lens or window, which may be located miles above the Earth where repairs are expensive to accomplish, if at all possible.

Thus, a heretofore unaddressed need exists in the lens industry to address the aforementioned deficiencies and inadequacies.

SUMMARY OF THE INVENTION

Embodiments of the present invention provide a system and method for providing a hermetically sealed lens and window assembly. Briefly described, in architecture, one embodiment of the system, among others, can be implemented as follows. The assembly contains a lens having a first surface, a second surface, and a side surface, the lens having a first outside dimension; a frame having a first generally vertical surface, the frame having a first inside dimension greater than the first outside dimension of the lens; and a mechanical joint coupling the lens to the frame, the joint aligned in the plane of the lens to minimize a bending moment being imposed on the lens which may be caused by differing coefficients of thermal expansion of the lens and the frame.

The present invention can also be viewed as providing methods for providing a hermetically sealed lens or window assembly. In this regard, one embodiment of such a method, among others, can be broadly summarized by the following steps: inserting a lens or window having a first outside dimension in a frame having a first inside dimension; forming a mechanical joint between an outside surface of the lens and an inside surface of the frame, the mechanical joint being in a plane of the lens to minimize a bending moment being imposed on the lens.

Other systems, methods, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

For exemplary purposes, the following describes a hermetically sealed lens assembly and method of providing the same. It should be noted, however, that alternative hermetically sealed lens assemblies may be provided in accordance with the present invention. The present invention is intended to include different lens assemblies where a solder joint between a lens (described below) and a frame (described below) provides a hermetic seal. The present invention may also include hermetically sealing and attaching non-lens assemblies. Reference herein will be made to lenses or window assemblies and is intended to cover, for example, pieces of glass with or without light focusing capabilities.

Figure 1:
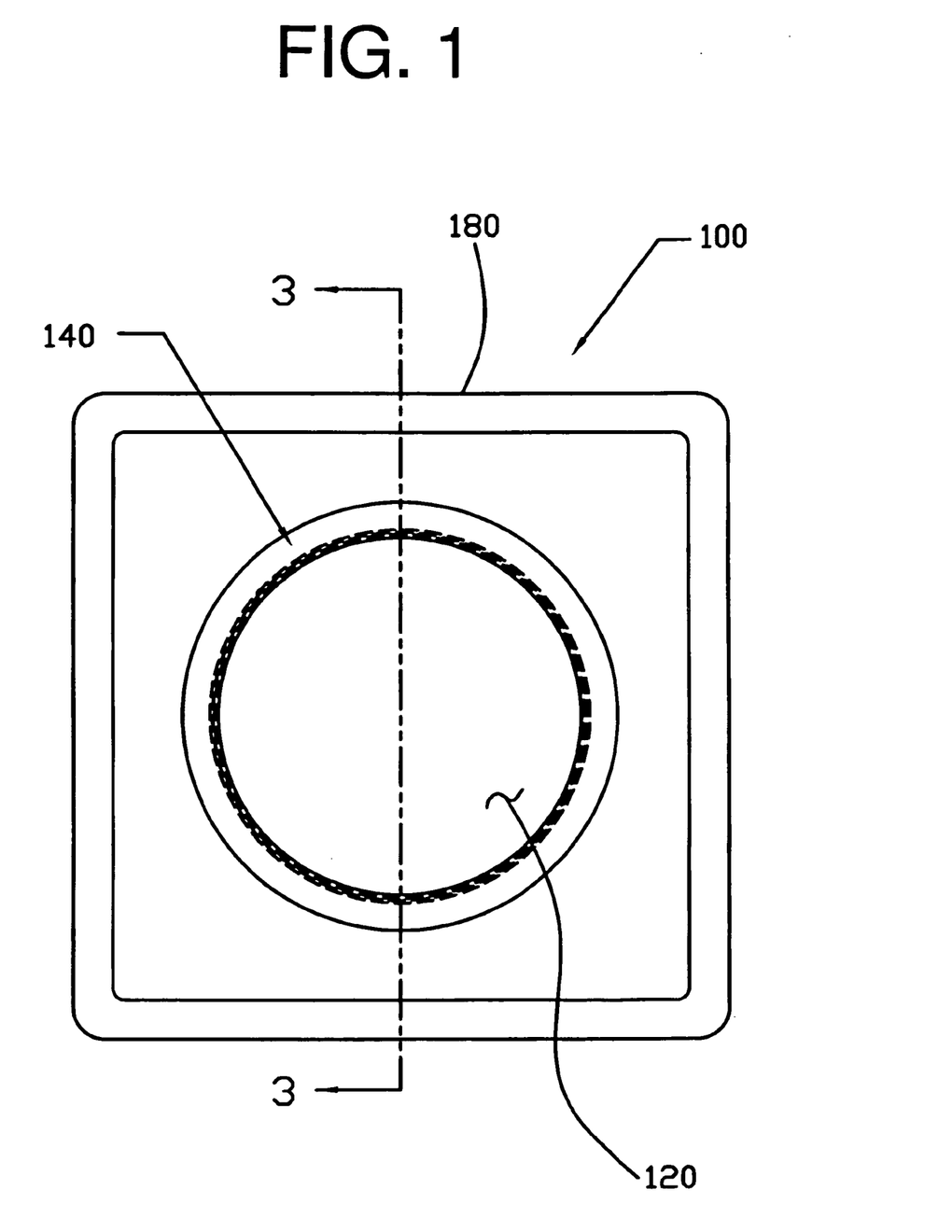
FIG. 1 is a top view of a lens or window assembly coupled to a lid in accordance with a first exemplary embodiment of the invention.
Figure 2:
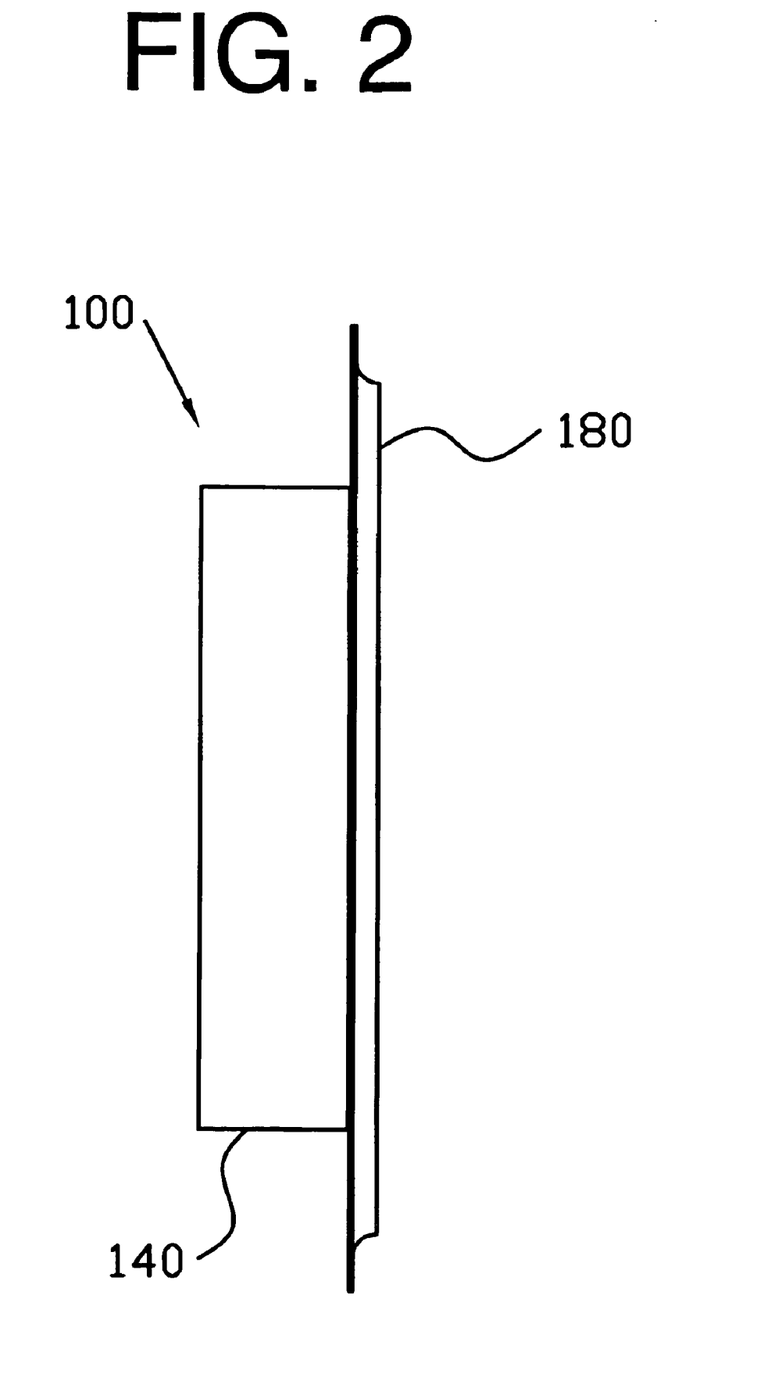
FIG. 2 is a side view of the assembly of FIG. 1.

FIG. 1 is a top view of a lens or window assembly coupled to a lid in accordance with a first exemplary embodiment of the invention and FIG. 2 is a side view of the assembly of FIG. 1. In accordance with the first exemplary embodiment of the invention, a lens or window assembly 100 contains a lens or window 120 and a frame 140, each of which is described in detail below with reference to FIG. 1–FIG. 5. The frame 140 may be secured to a lid 180, which in turn may be secured to an enclosure that houses electronic components associated with the lens or window assembly 100. The frame 140 provides a transition member between the lens or window 120 and the lid 180. The lens or window 120 and frame 140 may stick out, stay within, or straddle an enclosure (not shown). The lens or window 120 and frame 140 may straddle an enclosure by providing indentations in the lid 180. A first generally vertical surface 142 (FIG. 4), which will be described in greater detail herein, fits within the indentation and allows the frame 180 and lens or window 120 to be seated between the surfaces of the lid 180. The optimum shape of the lens or window 120, from a stress standpoint, is circular, but other shapes may be used without departing from the present invention. Likewise, the shape of the lid 180 is shown as being rectangular, but other shapes may be used without departing from the present invention.

Figure 3:
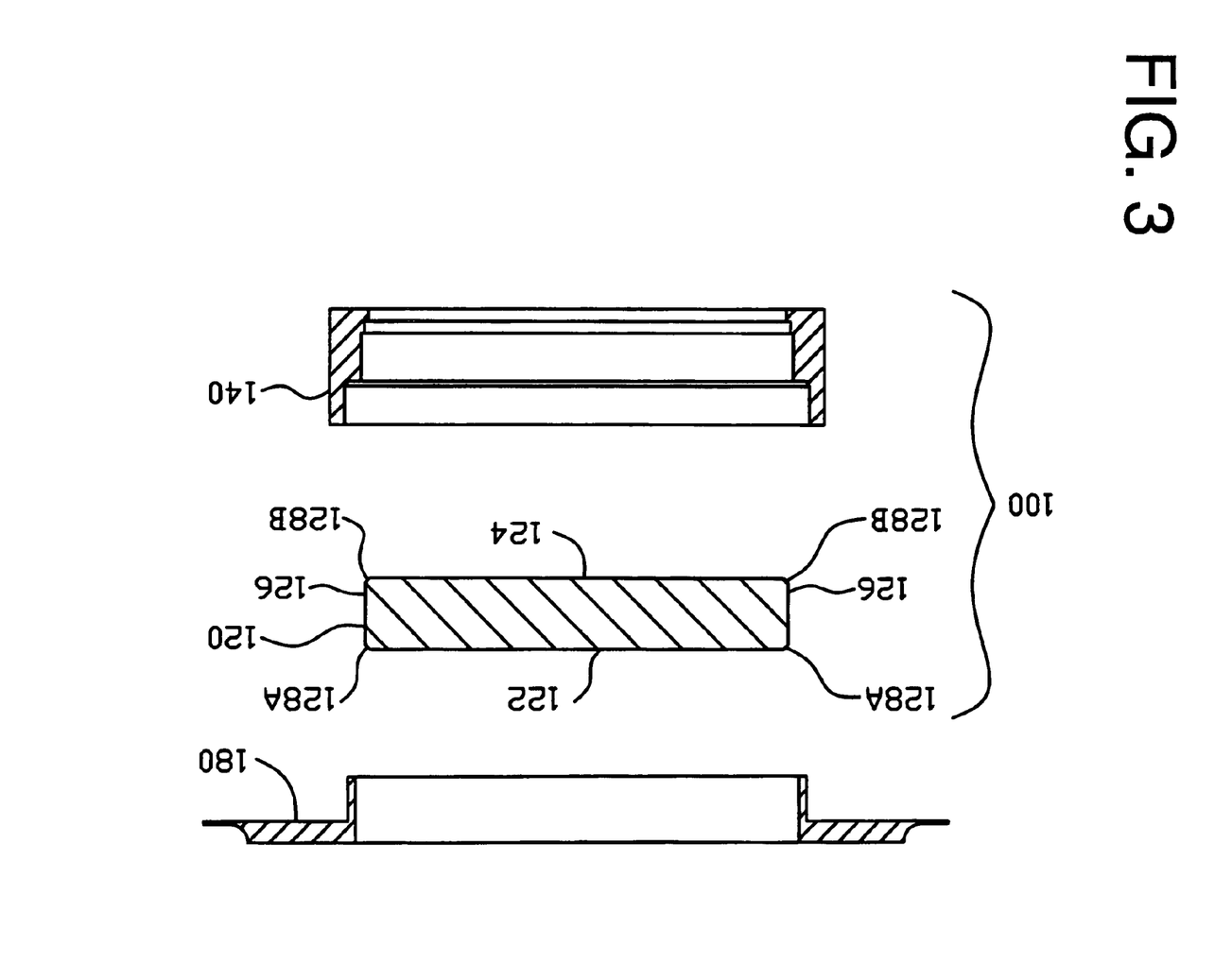
FIG. 3 is an exploded sectional view of the assembly of FIG. 1, taken through line 3—3 in FIG. 1.
Figure 4:
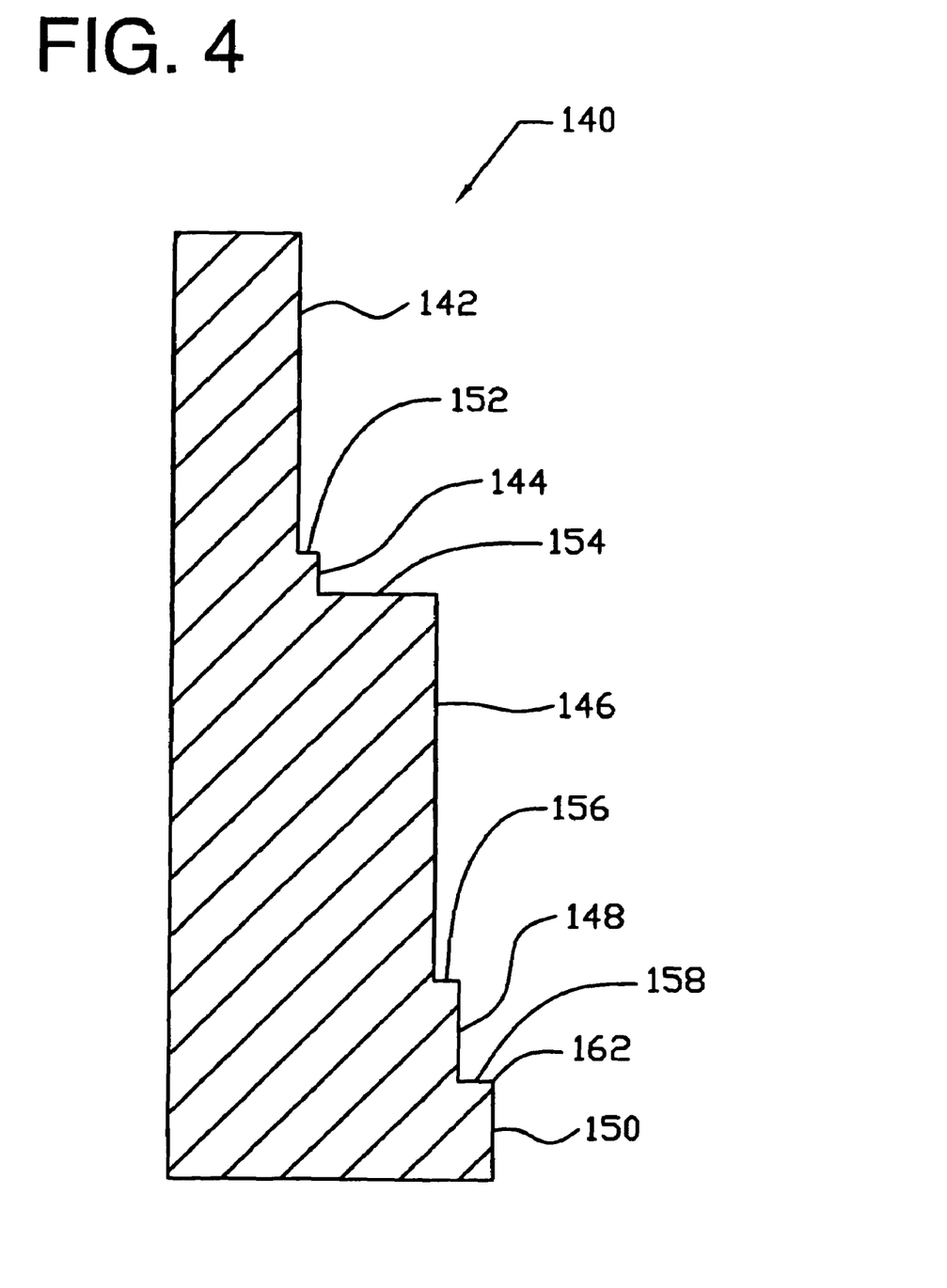
FIG. 4 is a sectional view of a frame of the assembly of FIG. 1.

FIG. 3 is an exploded sectional view of the lens or window assembly 100 of FIG. 1 taken through line 3—3 in FIG. 1, and FIG. 4 is a sectional view of the frame 140 of the lens or window assembly 100 of FIG. 1. In this embodiment, when assembled, a portion of the lid 180 is located within the frame 140. The lens or window 120 may have a first surface 122, a second surface 124, and a side surface 126. The first surface 122 and second surface 124 are shown parallel but are not required to be parallel. A first chamfer 128A may be located between the first surface 122 and the side surface 126, and a second chamfer 128B may be located between the side surface 126 and the second surface 124. The side surface 126 can have a coating or plating, for example, layers of Titanium, Nickel, and Gold, or some combination of material that may be deposited by a sputtering process, a physical vapor deposition process, an evaporative process, or any other process, which provides good adhesion and a solderable surface.

Referring to FIG. 4, the frame 140 may have a stepped interior surface. The frame 140 may have a first generally vertical surface 142, a second generally vertical surface 144, a third generally vertical surface 146, a fourth generally vertical surface 148, a fifth generally vertical surface 150, a first generally horizontal surface 152, a second generally horizontal surface 154, a third generally horizontal surface 156, and a fourth generally horizontal surface 158.

Figure 5:
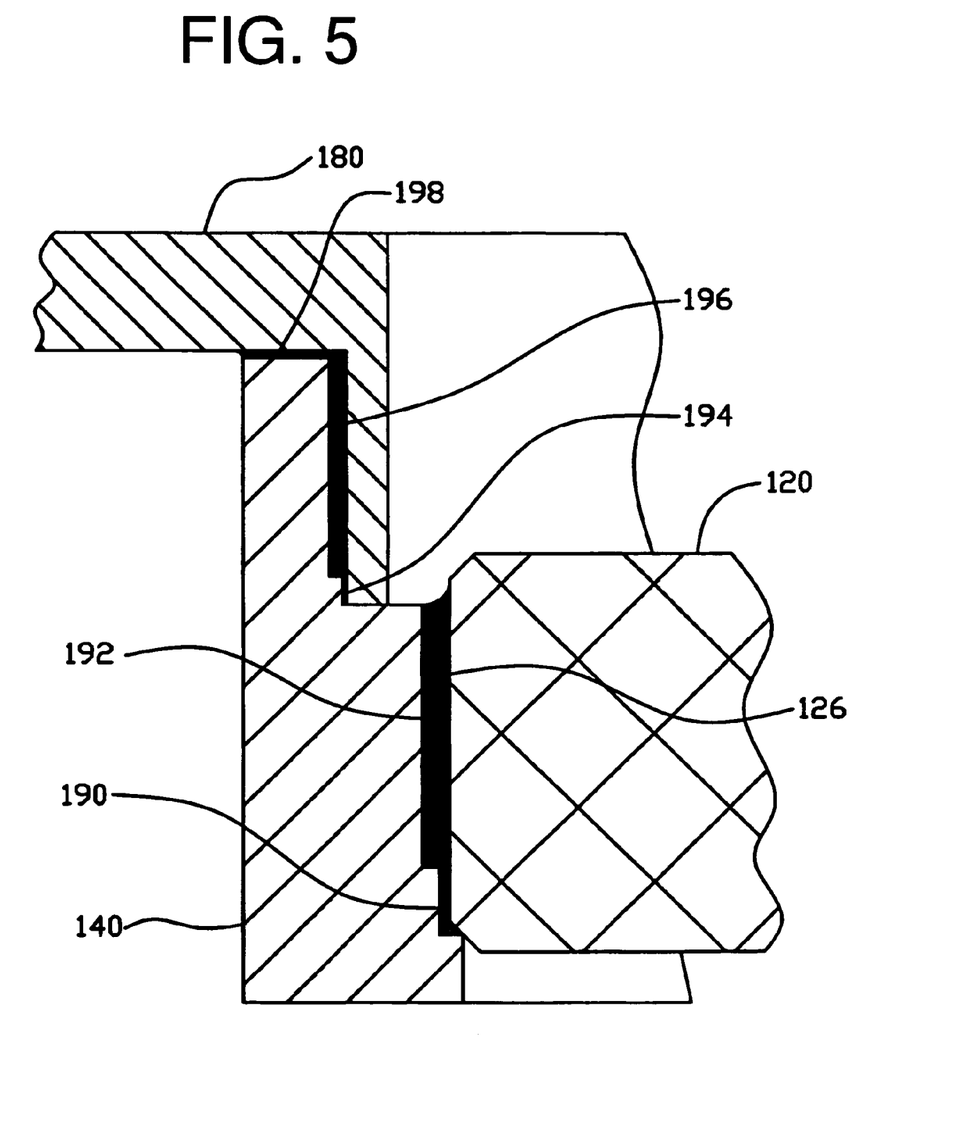
FIG. 5 is a sectional view of the assembly of FIG. 1.

FIG. 5 is a sectional view of the lens or window assembly 100 of FIG. 1. A first gap 190 may exist between the fourth generally vertical surface 148 and the side surface 126 of the lens or window 120; a second gap 192 may exist between the third generally vertical surface 146 and the side surface 126 of the lens or window 120; a third gap 194 may exist between the second generally vertical surface 144 and the lid 180; a fourth gap 196 may exist between the first generally vertical surface 142 and the lid 180; and a fifth gap 198 may exist between the frame 140 and the lid 180. The gaps 190, 192, 194, 196, and 198 allow for manufacturing tolerances and provide space for a solder joint. The purpose of the first gap 190 is to radially locate the lens or window 120 in the frame 140, and may be as small as possible. The second chamfer 128B may come into point contact with a corner 162 (FIG. 4) formed between the fourth generally horizontal surface 158 and the fifth generally vertical surface 150. The gaps 190, 192, 194, 196, and 198 may have different thicknesses. The second gap 192 and the fourth gap 196 are sized to achieve thick conformal solder joints. A conformal solder joint has a thickness sufficient to absorb strain without failure. The desired maximum width of the second gap 192 and the fourth gap 196 is the maximum width that will still allow capillary action of the solder. The first gap 190 and the third gap 194 are sized, for example, 0.005–"0.006", to achieve a functional solder joint. A functional solder joint is not too thick or too thin and therefore provides adequate capillary action to form a complete solder joint. A solder joint in the fifth gap 198 is relatively non-functional in terms of leak integrity.

The lens or window 120 may be secured to the frame 140 with a mechanical joint, for example, through a soldering process, to provide a complete hermetic assembly. The solder may be a soft solder, for example, but not limited to, Sn 62, Sn 63, Sn 96, or Sb 5. Soft solder is more desirable because it absorbs strain better than hard solder, for example, 80/20 solder. The solder may fill the first gap 190 and the second gap 192 between the lens or window 120 and the frame 140; and the solder may fill the third gap 194, the fourth gap 196, and the fifth gap 198 between the frame 140 and the lid 180. The solder fills the gaps and forms a complete joint around the lens or window, thereby providing a hermetic seal.

It is desirable that the solder joint formed between the lens or window 120 and the frame 140 is in compression during cool down of the solder. This may be accomplished by choosing a material for the frame 140 that has a greater CTE than the CTE of the lens or window 120. For example, if the lens or window 120 is made of fused silica, which has a CTE of less than 1, the frame 140 can be made of Kovar®, which has a CTE of 5.

The location of the gap 192 ensures that any stress caused, for example, by differences in the CTE of the lens or window 120 and the frame 140, is in the plane of the lens, i.e., the forces do not create an appreciable bending moment on the lens or window 120 that would cause the shape of the lens or window 120 to change, thereby affecting the optical properties of the lens or window 120.

If the material for the frame 140 and the lid 180 is the same, the frame 140 and the lid 180 may be joined using a mechanical joint, for example, through a soldering or welding process, to provide a complete hermetic assembly. If the frame 140 and the lid 180 are welded, the frame 140 and lid 180 do not have to be in radial compression. If the material for the frame 140 and the lid 180 are made of materials having differing CTEs, it is desirable to have the solder joint formed between the frame 140 and the lid 180 in radial compression during cool down of the solder. In the configuration shown in FIGS. 1–5, the CTE of the frame 140 should be greater than or equal to the CTE of the lid 180. For example, if the lid 180 is made of kovar, which has a CTE of approximately 5, the frame 140 could be made of alloy 48 or 49, which has a CTE of approximately 7–8.

Figure 6:
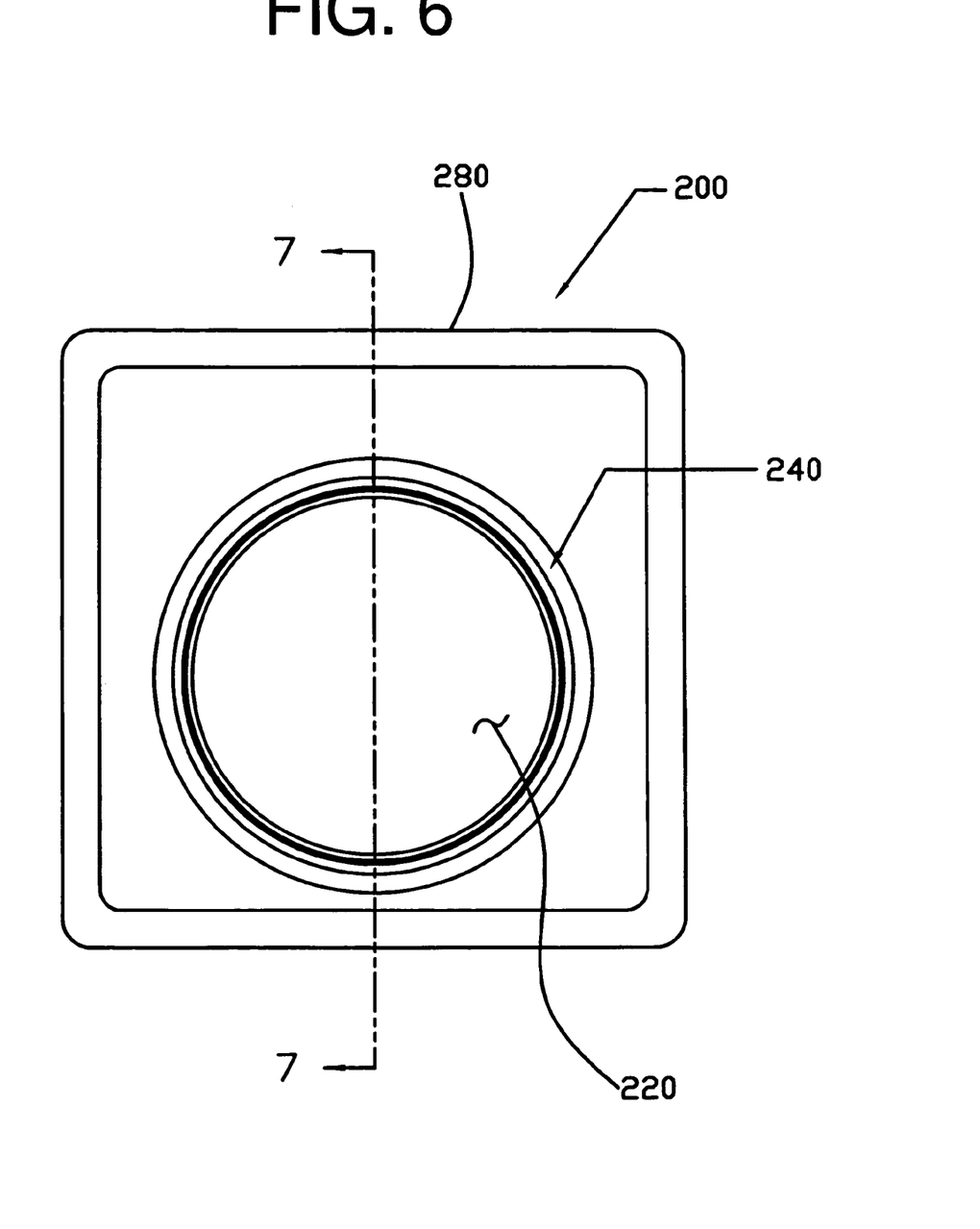
FIG. 6 is a top view of a lens or window assembly coupled to a lid, in accordance with a second exemplary embodiment of the invention.
Figure 7:
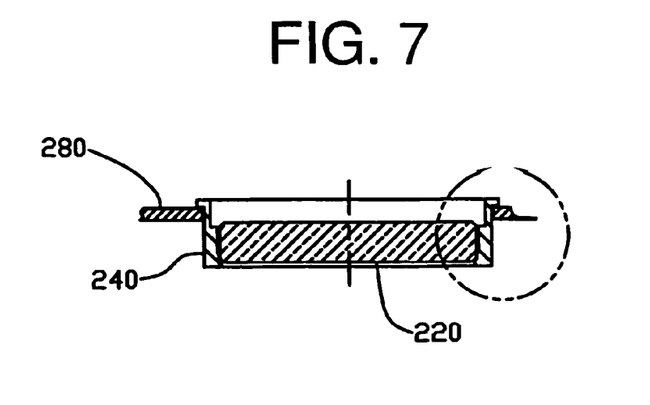
FIG. 7 is a sectional view of the assembly of FIG. 6.

FIG. 6 is a top view of a lens assembly 200, in accordance with a second exemplary embodiment of the invention, coupled to a lid 280. FIG. 7, which is a sectional view of the lens assembly 200 of FIG. 6, and FIG. 8, which is a sectional view of the lens assembly 200 of FIG. 6, show how a frame 240 for holding a lens or window 220 is hermetically sealed to the lid 280. In this embodiment, a portion of the frame 240 is located within the lid 280. In this embodiment of the invention, the lens or window 220 is coupled to the frame 240 with a mechanical joint 290 and 292, and the frame 240 is coupled to the lid 280 with a mechanical joint 298. In this embodiment, radially applied stress on the lens or window 220, resulting from a temperature change, is in the plane of the lens or window 220. The inside surface of the lid 280 may also include steps as described above.

Figure 8:
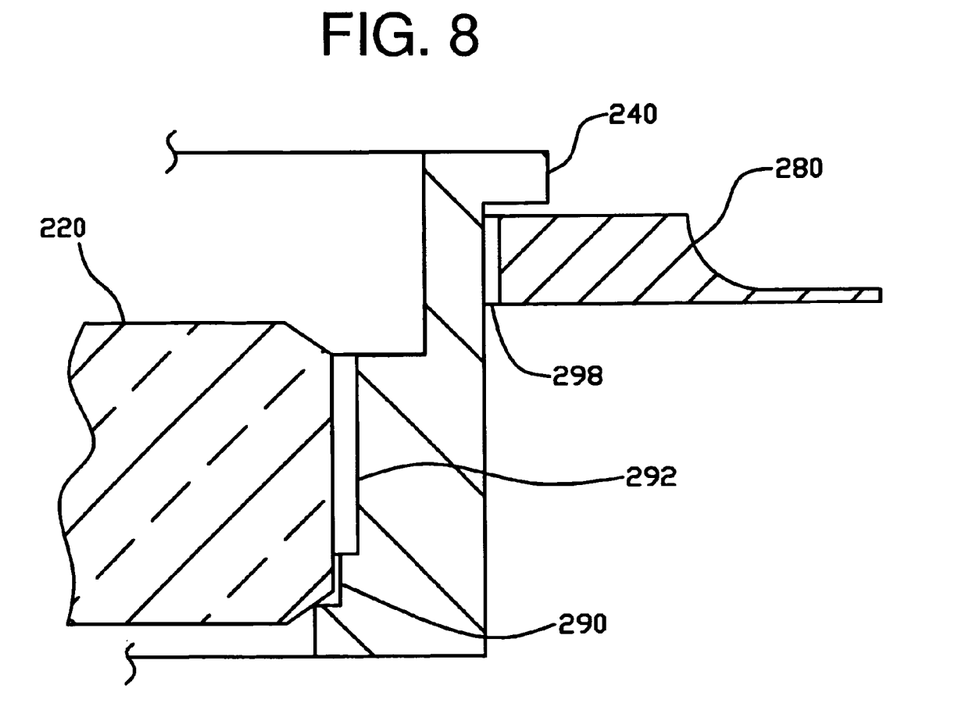
FIG. 8 is a sectional view of the assembly of FIG. 6.

In another embodiment not shown, but similar to the step at mechanical joint 290, a gap formed by one step may be used to locate the frame 240 relative to the lid 280 prior to mechanically joining the frame 240 and the lid 280. In yet another embodiment, a gap may be formed by a second step, as shown in FIG. 8, located at the formation of mechanical joint 298. The second step may be used to form the mechanical joint 298.

If the material for the frame 240 and the lid 280 is the same, the frame 240 and the lid 280 may be joined using a mechanical joint, for example, through a soldering or welding process, to provide a complete hermetic assembly. If the material for the frame 240 and the lid 280 are made of materials having differing CTEs, it is also desirable to have the solder joint formed between the frame 240 and the lid 280 in radial compression during cool down of the solder. In the configuration shown in FIGS. 6–8, the CTE of the frame 240 should be less than or equal to the CTE of the lid 280. For example, if the frame 240 is made of Kovar®, which has a CTE of approximately 5, the lid 280 could be made of alloy 48 or 49, which has a CTE of approximately 7–8.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A lens assembly, comprising:
a lens having a first surface, a second surface, and a side surface, the lens having a first outside dimension;
a frame having a first generally vertical surface, the frame having a first inside dimension greater than the first outside dimension of the lens, the frame having a larger coefficient of thermal expansion than that of the lens, and the frame having an outside dimension less than the inside dimension of an opening in a lid;
a first mechanical joint coupling the lens to the frame, the joint aligned in a plane of the lens to minimize a bending moment being imposed on the lens; and
a second mechanical joint between the opening of the lid and outside dimension of the frame, the joint aligned in the plane of the lens to minimize a bending moment being imposed on the lens which may be caused by a change in temperature.

2. The lens assembly of claim 1, wherein the frame has a second generally vertical surface, the frame having a second inside dimension greater than the first outside dimension of the lens and the first inside dimension of the frame.

3. The lens assembly of claim 1, wherein the frame has a third generally vertical surface, the frame having a third inside dimension less than the first outside dimension of the lens and the first inside dimension of the frame.

4. The lens assembly of claim 1, wherein the joint provides a hermetic seal between the lens and the frame.

5. The lens assembly of claim 1, wherein the joint is a solder joint.

6. A lens assembly comprising:
a lens having a first surface, a second surface, and a side surface, the lens having a first outside dimension;
a frame having a first generally vertical surface, the frame having a first inside dimension greater than the first outside dimension of the lens, the frame having a larger coefficient of thermal expansion than that of the lens;
a first mechanical joint coupling the lens to the frame, the joint aligned in a plane of the lens to minimize a bending moment being imposed on the lens;
a lid;
the frame having a second generally vertical surface, the frame having a second inside dimension greater than the first inside dimension of the frame; and
a second mechanical joint coupling the lid to the frame, the joint aligned in the plane of the lens to minimize a bending moment being imposed on the lens which may be caused by a change in temperature.

7. The lens assembly of claim 6, wherein the joint provides a hermetic seal between the lens and the frame.

8. The lens assembly of claim 6, wherein the joint is a solder joint.

9. A method of providing a hermetic seal between a lens and a surrounding frame, comprising the steps of:
inserting a lens having a first outside dimension in a frame having a first inside dimension;
forming a first mechanical joint between an outside surface of the lens and an inside surface of the frame, the mechanical joint being in a plane of the lens to minimize a bending moment being imposed on the lens;
inserting the frame having a second generally vertical surface and a second inside dimension greater than the first inside dimension of the frame in a lid; and
forming a second mechanical joint between the lid and the frame.

10. The method of claim 9, wherein inserting further comprises the steps of resting the lens on an edge of a third generally vertical surface of the frame with the third surface having an inside dimension less than the first outside dimension of the lens and the first outside dimension of the frame.

11. The method of claim 9, wherein the joint is a solder joint.

12. A method of providing a hermetic seal between a lens and a surrounding frame comprising the steps of:
inserting a lens having a first outside dimension in a frame having a first inside dimension; and
forming a first mechanical joint between an outside surface of the lens and an inside surface of the frame, the mechanical joint being in a plane of the lens to minimize a bending moment being imposed on the lens, and the mechanical joint providing a hermetic seal between the lens and frame;
inserting the frame having an outside dimension in an opening of a lid; and
forming a second mechanical joint between the opening of the lid and the frame.

13. A lens or window assembly, comprising:
a means for directing light having a first surface, a second surface, and a side surface, the means for directing light having a first outside dimension;
a means for framing having a first generally vertical surface, the means for framing having a first inside dimension greater than the first outside dimension of the means for directing light, the means for framing having a larger coefficient of thermal expansion than that of the means for directing light, and the means for framing having an outside dimension less than an inside dimension of the means for housing;

a first means for coupling the means for directing light to the means for framing, the means for coupling aligned in the plane of the means for directing light to minimize a bending moment being imposed on the means for directing light;

a means for housing; and a second means for coupling between the means for housing and the means for framing.

14. The lens or window assembly of claim 13, wherein the means for framing has a second generally vertical surface and a second inside dimension greater than the first outside dimension of the means for directing light and the first inside dimension of the means for framing.

15. The lens or window assembly of claim 13, wherein the means for framing has a third generally vertical surface and a third inside dimension less than the first outside dimension of the means for directing light and the first inside dimension of the means for framing.

16. The lens or window assembly of claim 13, wherein the means for coupling provides a hermetic seal between the means for directing light and the means for framing.

17. The lens or window assembly of claim 13, wherein the means for coupling is a solder joint.

18. A lens or window assembly, comprising:

a means for directing light having a first surface, a second surface, and a side surface, the means for directing light having a first outside dimension;

a means for framing having a first generally vertical surface, the means for framing having a first inside dimension greater than the first outside dimension of the means for directing light, the means for framing having a larger coefficient of thermal expansion than that of the means for directing light;

a first means for coupling the means for directing light to the means for framing, the means for coupling aligned in the plane of the means for directing light to minimize a bending moment being imposed on the means for directing light;

means for housing;

the means for framing having a second generally vertical surface and a second inside dimension greater than the first inside dimension of the means for framing; and second means for coupling the means for housing to the means for framing.

* * * * *